United States Patent

Wells (10) Patent No.: US 9,444,257 B2
(45) Date of Patent: Sep. 13, 2016

(54) HIERARCHICAL CONTROL OF MICRO-GRIDS

(71) Applicant: OSIsoft, LLC, San Leandro, CA (US)

(72) Inventor: Charles H. Wells, San Diego, CA (US)

(73) Assignee: OSIsoft, LLC, San Leandro, CA (US)

( * ) Notice: Subject to any disclaimer, the term of this patent is extended or adjusted under 35 U.S.C. 154(b) by 0 days.

(21) Appl. No.: 14/956,684

(22) Filed: Dec. 2, 2015

(65) Prior Publication Data

US 2016/0156190 A1 Jun. 2, 2016

Related U.S. Application Data

(60) Provisional application No. 62/086,479, filed on Dec. 2, 2014.

(51) Int. Cl.
*H02J 3/38* (2006.01)
*H02J 3/16* (2006.01)
*H02J 3/32* (2006.01)

(52) U.S. Cl.
CPC ............... *H02J 3/382* (2013.01); *H02J 3/16* (2013.01); *H02J 3/383* (2013.01); *H02J 3/32* (2013.01)

(58) Field of Classification Search
None
See application file for complete search history.

(56) References Cited

U.S. PATENT DOCUMENTS

| | | | |
|---|---|---|---|
| 8,457,912 B1 | 6/2013 | Wells | |
| 8,498,752 B2 | 7/2013 | Wells | |
| 2010/0133816 A1* | 6/2010 | Abolhassani | H02K 3/28 290/44 |
| 2012/0032617 A1* | 2/2012 | Jones | B63H 21/17 318/51 |
| 2012/0046889 A1* | 2/2012 | Sun | H02J 3/00 702/61 |
| 2012/0083935 A1* | 4/2012 | Wells | H02J 3/381 700/292 |
| 2013/0073109 A1 | 3/2013 | Cheng | |
| 2014/0039699 A1* | 2/2014 | Forbes, Jr. | G05B 19/02 700/286 |

\* cited by examiner

*Primary Examiner* — Jung Kim
*Assistant Examiner* — James Evans
(74) *Attorney, Agent, or Firm* — Lumen Patent Firm (57) ABSTRACT

A micro-grid control system has a first 2×2 decoupled controller that controls voltage and voltage angle by adjusting real and reactive power using real time feedback, and a second 2×2 decoupled controller that controls real and reactive power by adjusting voltage and voltage angle using real time feedback. The first 2×2 decoupled controller and second 2×2 decoupled controller together form a hierarchical microgrid control system, where the second 2×2 decoupled controller is a supervisory controller of the first 2×2 decoupled controller. The micro-grid control system may also include a third 2×2 decoupled controller that supervises the second 2×2 controller.

5 Claims, 9 Drawing Sheets

HIERARCHICAL CONTROL OF MICRO-GRIDS

CROSS-REFERENCE TO RELATED APPLICATIONS

This application claims priority from U.S. Provisional Patent Application 62/086,479 filed Dec. 2, 2014, which is incorporated herein by reference.

FIELD OF THE INVENTION

The invention relates to electrical power grids and, more specifically, to methods and systems for monitoring and controlling such power grids.

BACKGROUND OF THE INVENTION

Renewable energy power sources, such as solar photovoltaic (PV) arrays and wind turbines, are connected into micro-grids that are part of an area Electric Power System (macro-grid). In the near future, an estimated 25% of renewable resources will be behind utility and customer owned micro-grids at 50% total renewable generation and thus will be a significant portion of the future electric power grid. There will be many participants with control of the renewable sources with little knowledge of the complex grid and how it is managed. Micro-grids are a collection of loads and generation sources that act as a single entity to the macro-grid and can connect and disconnect from the macro-grid seamlessly. The renewable energy resources (Solar PV, fuel cell, battery, wind) in a micro-grid have little or no inertia and hence are difficult to control compared to systems with high inertia from rotating energy sources like combustion turbines or conventional steam turbines powered by conventional fossil fuels such as coal or natural gas. The IEEE 1547.4 standards clearly point out the sensitivity of micro-grids to instability and voltage stability issues. Controlling the power characteristics of such micro-grids is an increasing problem, since variations in frequency or voltage can cause the micro-grid to be disconnected from the broader macro-grid. Micro-grids can be of any size, although they are generally less than 20 MW in size.

SUMMARY OF THE INVENTION

The present invention relates to the use of hierarchical decoupled controllers for use in micro-grids that are operated either in connected or islanded control mode. This invention is related to the inventor's two U.S. Pat. Nos. 8,498,752 and 8,457,912, both of which are incorporated herein by reference. These two patents teach how to "decouple" voltage and frequency and unwrap angle information from phasor measurement units (PMUs). The controls are accomplished by using real time feedback control to regulate voltage and frequency (or angle) by adjusting real and reactive power. The present invention teaches how the controller in U.S. Pat. No. 8,498,752 can be inverted to use angle and voltage to control real and reactive power. In the present invention, the inventor discovered a technique to use both forms of the controller to regulate the real and reactive power demand from micro-grids. Additionally, the controller runs at much higher speeds than conventional Energy Management Systems and also executes with time synchronized data. The control system is simple compared to most systems since it involves only one form of the controller that can be used in a hierarchical configuration to control the micro-grid.

According to one aspect, the invention provides a micro-grid control system including a first 2×2 decoupled controller that controls voltage and voltage angle by adjusting real and reactive power using real time feedback, and a second 2×2 decoupled controller that controls real and reactive power by adjusting voltage and voltage angle setpoints using real time feedback. The first 2×2 decoupled controller and second 2×2 decoupled controller together form a hierarchical microgrid control system, where the second 2×2 decoupled controller is a supervisory controller of the first 2×2 decoupled controller. The micro-grid control system may also include a third 2×2 decoupled controller that supervises the setpoints of the second 2×2 controller.

In some embodiments, the first 2×2 decoupled controller is a unit level controller directly manipulating devices that control the supply and/or demand of a power bus, and the second 2×2 decoupled controller controls real and reactive power of the micro-grid to specified setpoints by adjusting angle and voltage setpoints of one or more unit controllers using real time feedback.

Preferably, the voltage and voltage angle, and/or the real and reactive power, are time synchronized with a GPS clock.

DETAILED DESCRIPTION

Nomenclature

PMU—phasor measurement unit.
CAISO—California Independent System Operator.
S—Apparent power (a vector of real and reactive power).
P—real power, watts.
Q—reactive power, vars.
V—voltage, volts.
δ—unwrapped angle, degrees.
X—vector of voltage angle and voltage, used in "State" estimation.
State—sufficient information about any system such that future states can be computed given measurements of the inputs.
Unit—a DER with P and Q output that generally can be specified, typical in "smart" inverters.
DER—distributed energy resources. Examples include Photovoltaic Inverter based systems, fuel cells, wind power, fuel cells and batteries.
Macro-grid—the main grid to which the micro-grid is attached.
Micro-grid—a collection of loads and sources, that act as a single point of control to the macro-grid and can disconnect and re-connect to the macro-grid.
State Variables—the pair of voltage and voltage angle at a point in the grid.
Apparent Power Variables—the real and reactive power pair of variables.
Controller (S,X)—Apparent power as input, state variables as output.
Controller (X,S)—State variables as input, apparent power as output.
Level 1—unit level controller, typically an (S,X) type controller.
Level 2—collection of units, supervisory controller for level 1 and typically a (X,S) controller.
Level 3—system level controller, supervisory controller for level 2, typically a (S,X) controller.
Inputs—independent variables that can be manipulated to cause the "state" of the system to change.
Control—the process of adjusting the input to a system to cause the output to achieve a specified setpoint.
Setpoint—the specified value of an output variable in a process.
Controller—the system that compares the controller setpoint with the output variable and makes adjustments to the process input variables. This can be hardware or software. In this description, the controller is software.

Underlying Theory of the Controller (Based on Ohm's Law)

Power grids inherently involve four key variables, P real power (watts), Q reactive power (vars), δ phase angle (degrees) and V potential (volts). These measured quantities interact with each other according to the vector form of Ohm's law that is often stated as S=EI*, where S is defined as apparent power, E is complex voltage and I* is the complex conjugate of current. The above formula can be expanded using Euler's formula into the four variables mentioned above as follows:

$$P = \frac{V_r V_s}{Z}\cos(\delta - \theta) + \frac{V_r^2}{Z}\cos(\theta) \tag{1}$$

$$Q = \frac{V_r V_s}{Z}\sin(\delta - \theta) + \frac{V_r^2}{Z}\sin(\theta) \tag{2}$$

where P is real power in each phase, Q is reactive power in each phase, $V_r$ is the voltage magnitude at the load, $V_s$ is the voltage magnitude at the generator, Z is magnitude of complex impedance between the load and the generation, δ is the voltage angle difference between the load and generation, and θ is the impedance angle. Note that the voltage angle δ and the voltage $V_r$ are the independent variables and P, Q are the dependent variables. There are other forms of these equations that can be derived by assuming that the line connecting the source and the receive power is only inductive: in that case, the real power equation contains the "sine" term and the reactive power equation contains the "cosine." This assumption is not realistic in micro-grid systems.

The voltage angle can be measured accurately using PMUs; however, as taught in the inventor's U.S. Pat. No. 8,457,912, the angle measurements from the PMUs are not smooth and therefore cannot be used for feedback control. This invention uses the smooth angle measurements as taught in U.S. Pat. No. 8,457,912 as well as the time synchronized P, Q, and V measurements from the PMU or relay. These measurements are reported at high data rates providing the means for the controllers to execute at much shorter time intervals compared to existing micro-grid and macro-grid control systems.

Concept of Control Pairs

The P,Q pair is defined as S and the pair voltage V,δ are referred to as the state X of the grid at the measuring point. This pair is called "state" since knowing the value of the state variables, one can predict the future behavior of the state knowing the future loads and generation. This fact is used in network forecasting programs and is used in many modern control systems. The four variables at any common point in the grid can be represented by the pair (S,X), where S is the input to the bus and X is the output. However, at other points in the grid network, we can reverse the inputs and outputs (X,S) to represent a portion of the grid to be controlled. We describe a method of controlling the pair (S,X) or the pair (X,S) using the same fundamental equations but one being the inverse of the other and also where one portion of the grid can be used to control a portion of the grid that is the hierarchical child of the controlling grid. The controlling portion and the controlled portion have to be in the same "tree" of the electrical power network.

Controller Basic Concept

The electric power system is conventionally controlled using "man-in-the-loop" systems. That is, the human operator will make a decision to increase or decrease power to the system by manually sending "generation" orders to power plants to change the amount of real power injected into the grid. The same is true for reactive power orders. This is power that is not consumed by the loads but oscillates across the system and can create congestion in the grid by increasing the energy dissipation losses in the grid. Reactive power also has the advantage of being able to help support the voltage in the grid. Thus the grid has to deal with two forms of power, real and reactive, that are caused to flow by changes in voltage angle and voltage. Clearly there are two basic inputs and two basic outputs for any electric power grid. The present invention takes advantage of this fact by using the above formulae in feedback control systems.

Note also that the independent and dependent variables can be "inverted" and thus the inputs and outputs are reversed. This allows one fundamental type of control system to be used in multiple ways. Given a model of a system and measurements of its input and outputs, one can design a feedback control system that will have setpoints that define the desired values of the output variables and measured values of the outputs. The model of the system can be used to implement the controller. One method of implementing a feedback controller is to use Model Reference control and another is to use Model Predictive control, followed by classical Proportional, Integral, Derivative control that is less dependent on the actual model of the process.

Systems with two inputs and two outputs have inherent cross-coupling. That is, by changing one of the inputs, both of the outputs change. This can be seen from equations (1) and (2) above, for example, if the voltage angle is changed, both P and Q change. The decoupling controller is designed to control each of the process outputs to a setpoint value and provide automatic feedback control for any changes to the system both as a setpoint change and as a change due to load or generation disturbance.

One Method of Implementing Decoupled Control.

According to one embodiment of the invention, a distributed energy resource (DER) controller is designated as the first level controller for the micro-grid that is called a "Unit" controller. The measurements are preferably time synchronized to the GPS clock defined by the IEEE C37.118 standard; however, there are cases where time synchronization may not be required. The GPS provides time accuracy to better than one microsecond at standardized time intervals. Typically, a DER is a single generation source such as a photovoltaic/inverter feeding into a distribution circuit. There may be several controllable DERs regulated by Unit (level one) controllers in the network. Some DERs may not be able to participate in the control system since they are equipped with older inverters implemented with maximum power tracking systems and thus have no "smart" functionality and have no ability to respond to an external control signal specifying a specific value of P or Q. A controllable DER could be a battery system or a PV system that has an inverter that is capable of accepting independent real power (P) and reactive power (Q) commands (the equivalent of S) from the local DER controller. A Unit (level one) controller is any part of the power grid that has independently controlled S as inputs.

The hierarchical control system includes Units (S,X) and Collections (X,S). The notation (S,X) means S is input to the system and X is the output. For example, a PV/inverter is an (S,X) unit with (P, Q) (i.e., S=P+jQ) as input and (V, δ) (i.e., $X=Ve^{j\delta}$), also written as V(cos(δ)+jsin(δ)), as output. For the purpose of describing the basic concept will we focus on a three level hierarchical control system that illustrates the general principles of the invention and its application to the control of a micro-grid.

Supervisory Control

Generally, a supervisory control hierarchy could have multiple levels of controllers. Consider a case of two levels of control. For example, in other industries, this might be a valve position controller supervised by a flow controller. This controller may in-turn be supervised by a temperature controller, thus there are three controllers in this hierarchy: (1) valve position, (2) flow, and (3) temperature.

In the case of two level implementations of hierarchical control, an embodiment of the present invention uses two levels of controllers where both are decoupling controllers and the controllers are the "inverse" of each other. To the best of our knowledge this type of control architecture has not been implemented nor envisioned in either the power industry of any other process control application. The same basic operational principles are used by both controllers, but the independent and dependent variables are "inverted".

Figure 1A:
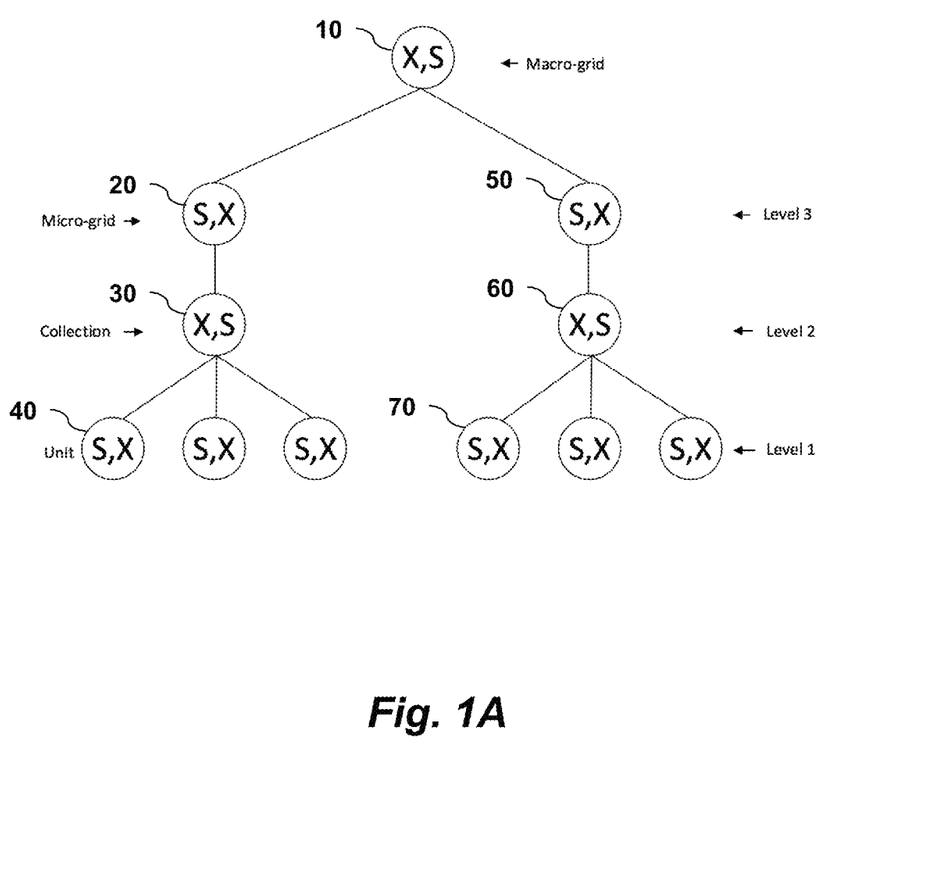
FIG. 1A is a schematic diagram of a hierarchical controller network according to an embodiment of the invention, where alternate levels have inverted variables, i.e., the independent and dependent variables assume opposite roles.

An overview of a network of these systems is shown in FIG. 1A.

The lowest level (level 1) in the hierarchy are local DERs denoted as (S,X) controllers, such as controllers 40 and 70. They have S as input and X as output. These are supervised by a level 2 controller called a collection, such as controller 30 supervising controller 40, and controller 60 supervising controller 70. The level 3 controller is supervised by a level 3 controller (S,X) decoupled controller, such as controller 20 supervising controller 30, and controller 50 supervising controller 60. Thus the highest level controller in a micro-grid is a supervising (S,X) controller. A macro-grid controller 10 supervises the microgrid controllers, such as controllers 20 and 50.

For example, consider a micro-grid connected to an area electric power system (EPS) or macro-grid. The micro-grid could be controlling the power flow (commonly called "demand") to a constant value specified by the macro-grid in response to a demand response or to an ancillary services agreement. Both the real and the reactive power can be specified to maintain a specific set point. For example, demand is currently used as the control method in the Fast Frequency regulation markets and reactive power could be used to control voltage in the Voltage regulation markets. This market does not yet exist in California, but is under consideration to help stabilize the grid as the percentage of renewable power increases. It is anticipated that this market will pay for the difference between the maximum real power output and the commanded reactive power that reduces the real power that could have been injected into the grid. A set point is a specific term used in control systems that specifies the desired value of the output variable and in the case of a 2×2 controller there are two setpoints. For the (S,X) system, the setpoints are represented by the variable $X_s$ and for the system (X,S) the setpoint is $S_s$.

Inside the micro-grid are one or more controllable distributed energy resources (DER). These are the primary controls and are called Unit "level 1" controllers. These can be solar PV, fuel cells, electric powered vehicles or batteries with "smart" inverters. This means the inverter can accept independent S commands rather than delivering all available power to the grid. In the simplest embodiment, a single DER is enabled to accept remote set point commands from the supervisory controller. This is called the "primary" controller. In systems with more than one DER, the one with the greatest sensitivity is called the "primary" and it is used to control the system by receiving new setpoint commands. An optional approach, as described in this invention, is for all the Level 1 controllers to be tuned to have the same closed loop response so that the setpoints of all controllable DERs can be changed at the same time. This provides maximum control force and the fastest response of the grid to changes in real and reactive setpoints of the level 2 controller (X,S).

The unit controller (S,X) is responsible for maintaining the X "state" measured at the DER load bus. The angle can be either the angle difference between the DER's bus and some other bus in the micro-grid, or it can be the angle between the GPS reference bus and the current DER bus. This is because the measured angle is defined as being relative to the GPS reference bus. The angles used in embodiments of this invention are derived from the "unwrapped angle". This is described in the inventor's U.S.

Pat. No. 8,457,912. This can be used to control the power flow from the battery to the bus, where negative means the battery is being charged.

According to embodiments of the present invention, the controller is characterized by specific equations (1) and (2) above. The second level controller supervises the first level controller. It uses the same model but is inverted (X,S), that is the apparent power is being controlled. A third level controller (S,X) could be used to supervise the second level controller. There are two forms of the models used in the hierarchy: (S,X) and (X,S). These are the inverse of each other and are derived from the vector form of Ohm's law. Note also that in certain cases where it is assumed that the impedance is 100% inductive, then equations (1) and (2) are modified as per standard equations in the power engineering literature. These equations do not have an impedance term and the cosine and sine terms are reversed. This disclosure includes the case where one would choose to implement the power flow equations in a simplified manner. Similarly, one could imagine a case where even further simplifications are used for the model and these are included as well. Because this approach is called "robust" control, it is even possible to attain satisfactory control assuming the model is zero. This approach is also included.

A hierarchical controller according to embodiments of the present invention may be used in both island and grid connected micro-grids. The controllers are the 2×2 decoupled type as described in U.S. Pat. Nos. 8,498,752 and 8,457,912.

Three Level Hierarchical Micro-Grid Controller

Figure 1B:
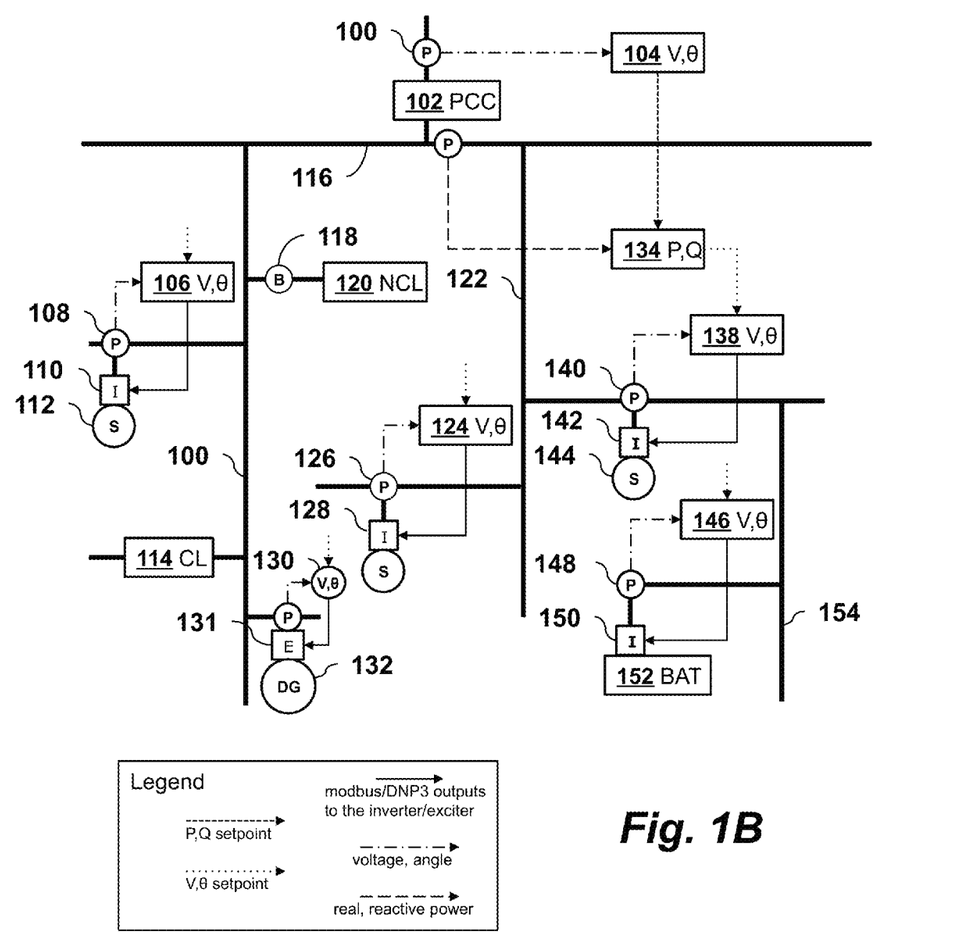
FIG. 1B is a schematic diagram of a three-level hierarchical micro-grid control system, according to an embodiment of the invention.

A micro-grid controller according to embodiments of the invention uses time synchronized data from PMUs for direct feedback control of the inverters associated with the distributed energy resources (DER): this includes distributed energy generation (DEG) and distributed energy storage (DES) systems. Identical DEG/DES controllers use measurements of voltage and voltage angle (X) as outputs and real power and reactive power (apparent power phasor=S) as inputs to the DER device. The measurements can be from relay protection devices or from dedicated PMU instruments. The example system uses three levels of cascade control architecture as shown in FIG. 1B. Cascade controls are used extensively in the process industry, the aerospace, and in military applications. In the present invention, frequency becomes a constraint on how fast angle set points can be changed. For example to maintain acceptable power quality, the frequency should remain ±0.05 Hz around the nominal frequency (60 Hz or 50 Hz). This means the "slew rate" of the angle setpoints are limited to 18 degrees per second. According to embodiments of the present invention, frequency is inherently regulated to the nominal interconnection value (60 or 50 Hz) by controlling with an (S,X) controller. This is because frequency is defined as the rate of change of angle, and hence if the angle setpoint is constant, by definition the frequency is at its nominal value.

Description of a Typical Three Level Microgrid Controller

The example controller is designed to both maximize ancillary services revenues while in "grid-connected" mode and independently control angle and voltage when the micro-grid is in "island mode." The islanded micro-grid is re-synchronized to the grid by matching "state" (X) across the point of common coupling (PCC). Planned islands are initiated by bringing the "state" difference across the PCC to zero before the breaker is opened: this occurs when the internal generation equals internal loads, thus there is no import or export of power into or out of the micro-grid.

A typical example of a micro-grid controller is shown in FIG. 1B. Unit control (S,X) is applied to each controllable Distributed Energy Resource (DER). A PMU 100 on the high side of the 102 PCC measures the voltage and angle "state" (X) on the high side of the point of common coupling (PCC). A similar measurement 116 is located on the low side of the PCC, such as shown on the low side of the micro-grid power distribution bus. The third level controller 104 is an (S,X) collection since it has P,Q inputs and (V, δ) as outputs. Controller 104 has voltage and voltage angle setpoints on the high side of the micro-grid with the inputs being the P and Q for the power grid. These are determined by the macro-grid using network flow programs to determine the optimal "state" of the each micro-grid in its region. It is interesting to note that if the high side voltage angle is held at a fixed setpoint, the frequency is exactly nominal. Thus for any given angle setpoint being maintained, the micro-grid could get paid for "autonomous" fast frequency regulation. This is currently available in the CAISO fast frequency regulation market.

The decoupled voltage and voltage angle controller allows independent settings of the voltage and angle set points. That is, the voltage set point can be changed while the voltage angle remains unchanged. The low voltage bus is shown as element 116. The elements 106, 108 110, 112 represent a level one controller of a PV solar DER being controlled. For example, 108 is a PMU that measures voltage, voltage angle, P, and Q from the protective relay and 106 is a 2×2 voltage and voltage angle decoupled controller sending P and Q commands to the PV inverter 110 driven by the PV panels 112. Element 118 is a remotely controlled breaker that controls power flowing to a non-critical load 120 in the micro-grid. Elements 122, 154 and 100 represent one of many feeder circuits off of the main low voltage bus. A critical load 114 is generally, the last load to be shed from the micro-grid so its load is typically supplied until all power is lost within the micro-grid. Elements 131 is the exciter controller of a typical diesel generator 132 and 130 represents the level one controller for a diesel generator. Note that the tuning of this controller will be different than other inverter based DERs since the DG has some inertia and hence will be slower to respond to load disturbances. Elements 128, 126, and 124 represent another typical DER controlling a solar panel in the micro-grid. A typical battery control system is represented by 150, 152, 148, and 146. The battery 152 can be charged or discharged via a four quadrant inverter 150 from the controller 146 using data from the PMU 148. Note that the "sign" of the angle controls the flow of power either into or out of the battery. The element 154 represents a lateral branch off of feeder 122. Elements 144, 142, 140, and 138 represent another typical solar PV DER. Each of the DERs have angle and voltage angle setpoints that are determined on startup by "bumpless" transfer. This means the current angle and voltage setpoints become equal to the current values of the voltage and angle at the instant the controller is turned on. Element 116 is the P and Q measurement for the entire micro-grid (real and reactive power demand of grid). The P, Q controller 134 gets its measured values from 116 and its setpoints from the 104 micro-grid level 3 controller if it is turned on. If not, the P and Q commands can come from a local load forecast or from the macro-grid requesting demand response or peak shaving. On initial startup, the setpoints of the level 2 controller become the same as the current value of P and Q, this is also known as "bumpless transfer". In this case, the P and Q setpoint values remain constant until the level 3 controller requests changes. When the level three controller is enabled, the micro-grid is operating under a fixed angle and fixed voltage setpoint determined by the macro-grid. Thus the "state" X of the power grid is controlled to a setpoint. The changes can be made by the macro-grid to insure Dynamic Security Assessment or to support the power grid for stability or for retail market transactions. Additionally, it is expected that the micro-grid may participate in high speed retail market transactions in the near future and will use the P, Q controller (level 2, (X,S)) to execute market orders. For example, the market may request a change in P by 1 MW. This transaction must be completed rapidly, perhaps in less than one second in advanced retail markets. The level 3 controller may also participate in the market by adjusting its voltage setpoint in response to orders to support reactive power markets. As outlined, if the voltage setpoint is changed, the voltage angle setpoint is not changed unless issued by a specific market command.

Unit controllers 146, 138, 124, 106 and 130 run at 60 Hz and send signals to the DER inverters to increase or decrease apparent power from the inverters 150, 142, 128, 110, and 131, respectively. Recall that, apparent power consists of two numbers, P and Q, commonly known as real and reactive power, also denoted as S. The inverters should be four quadrant type inverters so they can be used for control of batteries as well as used to generate VARs at night from the PV inverters.

Each DER controller could have angle and voltage set points initially established by a three-phase network flow program that runs every few seconds or maintain constant setpoint obtained by "bumpless" transfer if the level three or level two controllers are not operating. The level three controller 104 computes the P and Q setpoints for the level two controller 134. A constrained optimal load flow solution could be used to determine the optimal values for the setpoints at all three levels of control for the micro-grid. The "performance" function could include income streams from the sale of ancillary services to the grid and/or the power losses within the micro-grid could be used to determine the initial angle setpoints. This type of optimization can also be used to determine the optimal value of the voltage setpoints at each DER: this is similar to a technique known as Conservation Voltage Reduction (CVR) in which the voltage setpoints are set to their minimum legal values. This reduces the transmission losses in the micro-grid. This type of optimization could be done with most load-flow programs available; or can be done manually. Initially, the CAISO and Pennsylvania Jersey Maryland Interconnection (PJM) "mileage" markets could be the major source of income due to the implementation of FERC Order 755. Mileage in both CAISO and PJM is basically the sum of the absolute values of the power commands issued by the markets. The optimization could be executed over one-day-ahead planning interval and is re-solved each four second interval. This approach is often called Model Predictive Control (MPC). The network flow program could also be used to estimate the current values of the P and Q setpoints of level 2 controller (X,S) such that the maximum economic benefit is attained. Examples include Buy, Sell power, sell ancillary services, demand response, curtailment or other services to the connected grid including capital deferment and blackstart support.

Each decoupled controller 106, 130, 138, 146, 124 computes is own "sensitivity" and makes it available to the Level two controller. Sensitivity is the ratio of apparent power to the voltage phasor. The apparent power (P,Q) controller 134 outputs set point values every one second, or faster, determined by the level three controller. Note the set point values will "ramp" between the old and the new set point issued by the Level 3 controller. The S setpoints can ramp as fast as necessary, and in fact, can be step changes. The level 1 controller has constraints on the ramp rate of the angle setpoints.

The level one (Unit) controllers can be associated with multiple types of DER devices such as generators, fuel cells, PV systems, micro-turbines, wind turbines, pumped hydro and other types of DER devices each with a different response time and hence different inertia. One embodiment of this invention is to "tune" each of the (S,X) controllers to have the same closed loop response. This is often called "artificial inertia". This means that the slowest DER (typically the diesel generator) would be tuned to give its fastest dynamic response in closed loop mode and all other DERs in that microgrid would be tuned to the same closed loop response characteristic. In this event, the setpoints of all of the DERs in the microgrid can be changed simultaneously, rather than selecting only one of the DERs with the greatest sensitivity to be the "primary" control DER.

Level three controller (S,X) supervises the apparent power set points (P, Q) based on signals from a regional entity such as an ISO, the setpoint inputs to 104 to hold the voltage and angle constant (X). The level three controller has set points of angle and voltage that can be changed by the supervising macro-grid controller. This is because the grid-connected micro-grid may participate in the fast regulation markets that include frequency and voltage regulation. It is likely that the local Distribution Management System or DERMS will request information about the "state" of the micro-grid. This is defined as the pair (voltage, angle) and can be used by the DERMS to control the local Dynamic Security Assessment (DSA) of a local collection of microgrids. In some fast regulation markets, autonomous frequency regulation is supported (CAISO) while, in others, "move" commands are issued every four seconds and the micro-grid must achieve the commanded "move" in less than eight seconds to get paid. This is known as the mileage market. In this market, the macro-grid makes changes to the micro-grid "P" set point of the level two controller. The P,Q controller 134 must have a "settling time" of less than eight seconds in order to get paid for its' performance. The micro-grid may also sell into the spinning reserve market by using the (P, Q) set points by being able to reduce demand, thereby offering "Negawatts" to the grid. The micro-grid can also sell curtailment, down regulation, and demand response to the local Utility Company. These services are carried out using the (P,Q) controller set points. This requires that the closed loop response of the (P,Q) controller must be less than eight seconds.

The controllers 104, 106, 124, 130, 134, 138, and 146 use the standard PI System "unwrapped" template (see U.S. Pat. No. 8,457,912) to smooth the PMU measurements so they can be used for control. The "unwrapped" angle is a measure of the "distance" from the PMU reference angle measured to the nearest 0.1 degree or better. The "distance" from the reference angle can easily exceed ±200,000 degrees over a 24 hour period; this amounts to about ±9 seconds.

The control system 104, 106, 124, 130, 134, 138 146 is preferably implemented using the IEC 61970 Common Information Model (CIM). The CIM XML file may be created using the OSIsoft, LLC CIM Micro-grid Modeling Package or any method to create the CIM XML file. This CIM Micro-grid Modeling Package allows users to draw the topology of the micro-grid using Microsoft Visio then automatically create a CIM XML file. This file is used to configure both the OSIsoft, LLC PI-System and the network flow model. This technology applies to any micro-grid control system. CIM XML messages are also used to deliver and receive computed information from the network model. This greatly reduces the cost of configuring a micro-grid controller. The XML file automatically creates IEC 61850 object names. Thus micro-grids created using this approach can be maintained and expanded using standard XML text files. This approach enables add-in software packages to be written for a generic micro-grid and then applied across all micro-grids building using the IEC standards.

Third party applications could be easily written to provide services to CIM based micro-grids. This is analogous to the way Apple computer stimulated the development of custom applications for any device using the Apple iOS. The OSIsoft, LLC approach is similar since any software developer can write generic applications for any micro-grid developed using the OSIsoft, LLC CIM database structure.

Decoupled Controller Logical Flow Sheet

Figure 2:
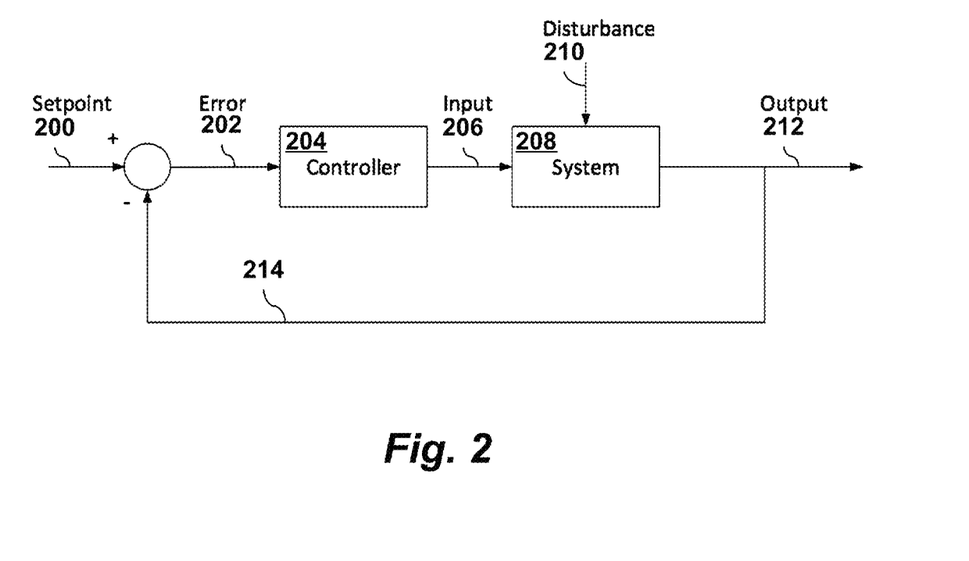
FIG. 2 is a schematic block diagram of a generic control system with feedback according to an embodiment of the invention.

A sketch of a generic control system according to an embodiment of the invention is shown in FIG. 2. This defines the terms used in the detailed implementation of the control system. Inputs 206 to a system 208 are the variables computed by the controller 204 and become inputs to the system being controlled. They can be the pair (P,Q) or the pair (V,δ) (S or X). Outputs 212 from the system are the variables to be controlled. They are used in a feedback path 214 as inputs to the controller 204. The set points 200 are the desired values of the system outputs 212. Disturbances 210 are any measured or unmeasured variables that effect the system outputs. Typically in a power system, the disturbances include changes in load or generation in a system. The error 202 is the difference between the Setpoint values and the measured values: this error signal is the input to the controller. This error signal is computed at high rates for Unit controllers, typically at 60 Hz using time synchronized measurements from the PMU output function of the protective relays supporting the Unit. The time synchronization intervals are defined in the IEEE C37.118 standard for PMUs.

One Specific Type of Decoupled Controller

Figure 3:
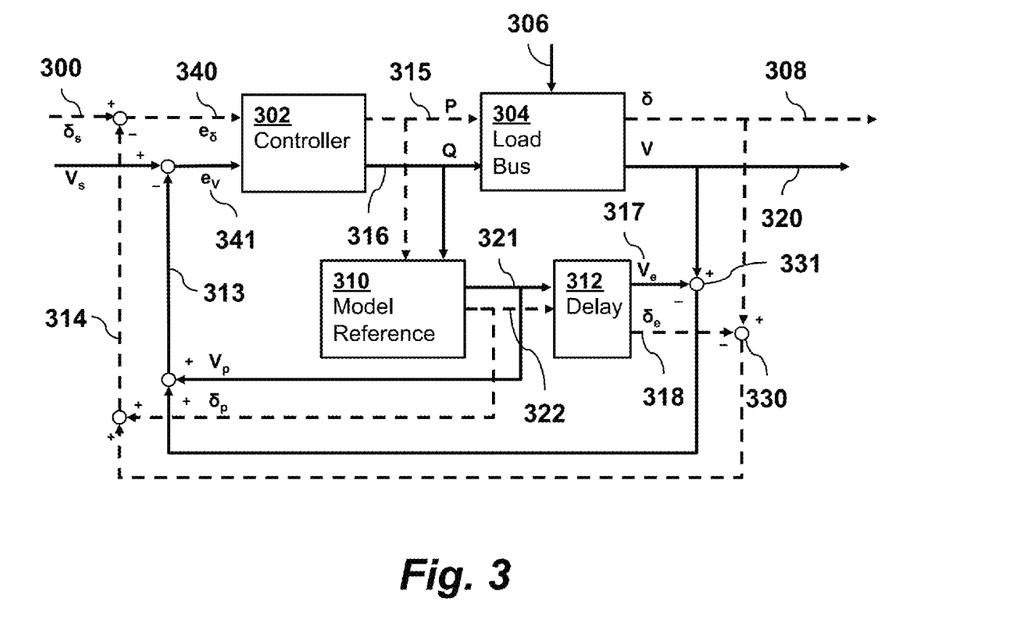
FIG. 3 is a schematic block diagram of a decoupled control structure for a micro-grid, using one type of decoupled controller, according to an embodiment of the invention.

One type of decoupled control structure for a micro-grid is shown in FIG. 3. Any type of decoupling controller may be used, but this is an explicit example of a controller structure that has been proven useful in other technical fields. This is often called model reference control since there is a simulated model of the grid in the controller. If the model and the delay blocks are zero, this becomes another type of decoupled controller according to another embodiment of the invention. There are many other types of multivariable control systems that could be used as the controller portion of the system. These are normally based on "state-space" concepts and are described in the control system literature and there are computer aided design tools such as the MatLab "Control Toolbox" that automatically compute the optimum controller given a "state" space model of the microgrid. The controller shown in FIG. 3 provides details of the micro-grid controller described in embodiments of this invention using one type of decoupled controller. The basic concept applies to most types of decoupled controllers.

In this example, the model is the basic (S,X) model computed from Ohm's law and the controller is called "model reference". However, a time delay is added to compensate for time delays in computation and communication delays, typically less than one second. Control with this type of delay is often called a "Smith Predictor". The inputs to the Unit are (P,Q) and the outputs are (V,δ). The Unit is the load bus receiving the power from the inverter and the loads and generation nearest to that bus. P is positive sequence real power injected to the load bus: Q is positive sequence reactive power, V is positive sequence voltage, and δ is the unwrapped positive sequence voltage angle (see U.S. Pat. No. 8,457,912 for a detailed description of this function and the OSIsoft Phasor service unwrapping template for instructions on how to configure this function). The P and Q commands are sent from the control software 302 to the inverter that outputs P and Q to the load bus 304 at the rate of 60 Hz according to IEEE C37.118 time intervals. The unwrapped angle 308 and voltage 320 used in the controller 302 are the unwrapped angle and time synchronized voltage. The four raw signals 308, 320, 315, 316 used for control are available from most modern digital protective relays. The angles are unwrapped using the method of unwrapping described in the inventor's prior patents referenced above. The voltage angle error 340 and the voltage error 341 are the difference between the setpoints and the total feedback signals 313 and 314.

The "model reference" function computes the predicted values voltage and angle and uses these directly in the feedback path 314. The predicted values 321, 322 are the outputs of the model reference component 310 of the controller. These are delayed 312 to represent the expected value of voltage and angle 317, 318. The error between the estimate and the measured values are computed and used in the set point comparator 330, 331 to compute the predicted error signal. Thus, if the estimates are good, there is no measured feedback. This is the "Smith Predictor" portion of the controller. Load bus 304 and load or generation disturbance 306 are described in more detail below. The signals 314 and 313 are the total feedback signals used to compute the controller errors 340 and 341. The error signals 340 and 341 represent the total error in the control loop and these are used as inputs to the decoupled controller.

Figure 4:
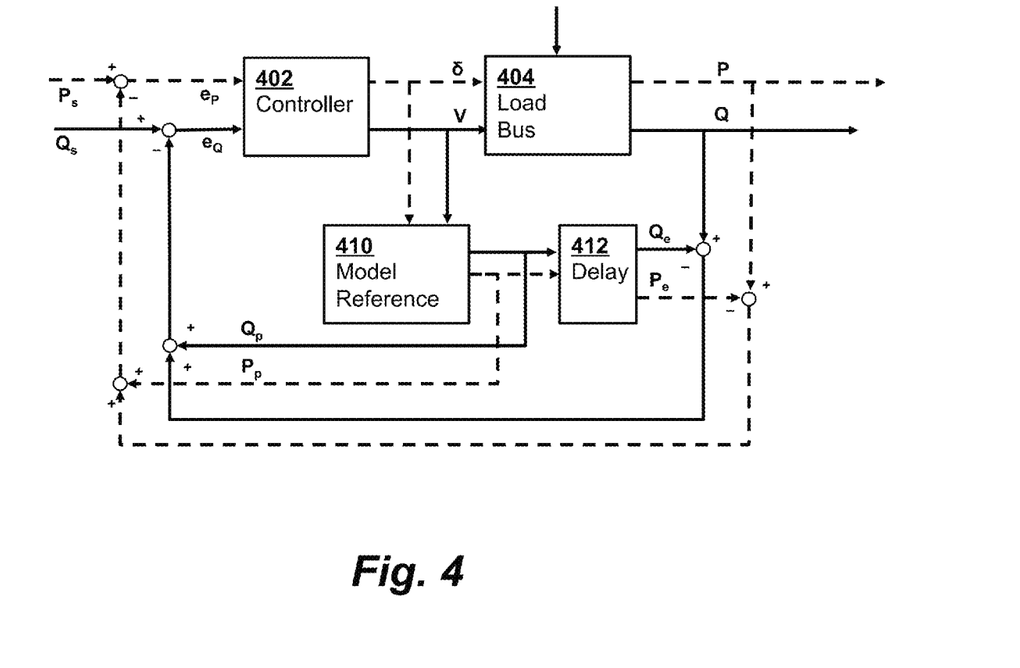
FIG. 4 is a schematic block diagram of a decoupled control structure for a micro-grid whose dependent and independent variables are inverted compared to the control structure of FIG. 3, according to an embodiment of the invention.

The control system can also be alternately configured (reversed or inverted) such that angle and voltage become inputs and the real and reactive power as outputs as shown in FIG. 4. This is used in (X,S), often referred to as level two controllers or power controllers in the micro-grid. In FIG. 4, the controller 402, load bus 404, model reference 410, delay 412 are connected and operate analogously as the corresponding elements in FIG. 3, except that the controller 402 is inverted so that the roles of (P,Q) and (δ,V) are reversed.

Figure 5:
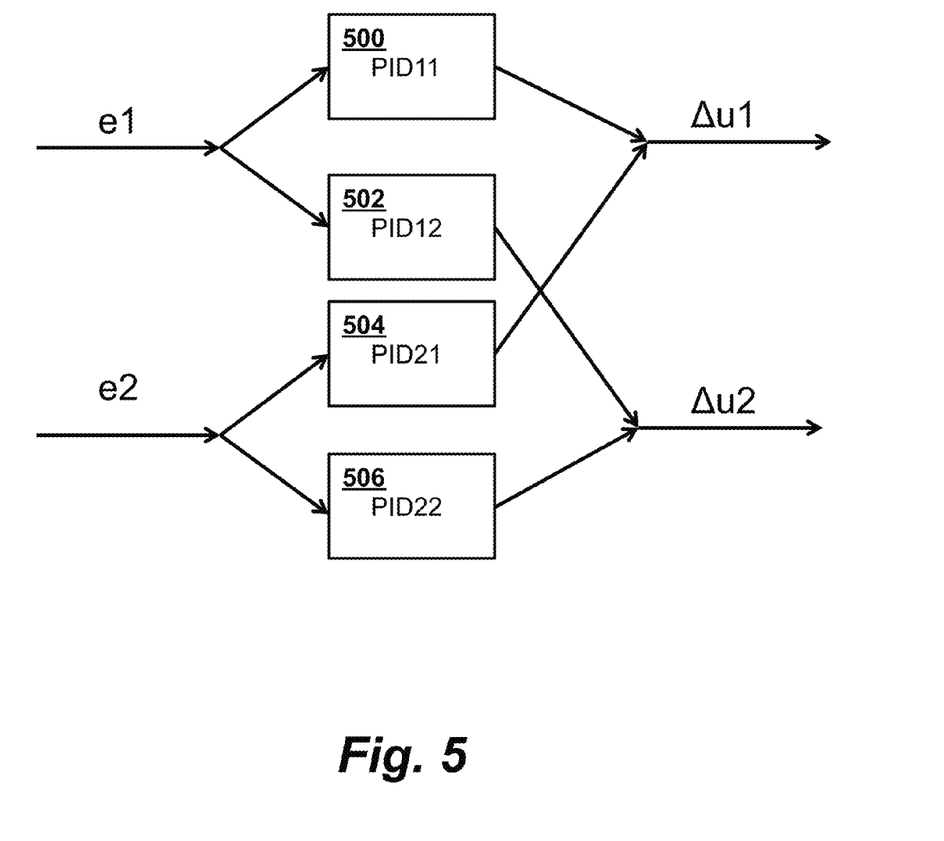
FIG. 5 is a schematic block diagram of an implementation of a decoupled 2×2 controller according to an embodiment of the invention.

The controllers, such as controller 402 (FIG. 4) and controller 302 (FIG. 3), have four PID controllers 500, 502, 504, 506 implemented in "velocity" mode, as shown in FIG. 5. The e1 and e2 signals are the controller input signals. For example, in FIG. 3 e1 and e2 correspond to 340 and 341. The u1 and u2 signals in FIG. 5 correspond to the incremental change in the output of the controller: these are added to the current P and Q signals to get the new value of P and Q (see 315 and 316 in FIG. 3). Note that PID12 502 and PID21 504 controller gains can be set to zero, thus this controller is equivalent to two independent controllers. Also by setting the Model reference to zero and the time delay to zero, the control becomes two independent control systems. Thus, it can be tuned to control voltage angle using P only and similarly can be tuned to control voltage only with Q, thereby defaulting to a conventional way of controlling voltage and voltage angle.

Each PID loop is implemented as a velocity function as shown below.

The normal PID loop is (position mode)

$$u = K_p e + K_i \int e\,dt + K_d \dot{e}$$

In velocity mode the PID controller becomes $$\dot{u}=K_p\dot{e}+K_ie+K_d\ddot{e}$$

The common names of $K_p$, $K_i$ and $K_d$ are the proportional, integral and derivative gains in common PID controller.

The velocity mode controller does not have an integral; hence, there is no "reset" windup; this is highly advantageous in control systems. This equation is discretized and used to compute the next value of the incremental output from the controller. Notice the first and second time derivatives (denoted by dots above the variables) are present. Best practice is to use filtered values of the error and its first and second derivative using a second order polynomial filter. There are other methods to compute the second derivative using auto regressive rate of change filters and other signal processing tools. The polynomial filter is the preferred method of implementation since it has been used successfully for many years.

The controller implementation is in discrete time where the time interval will be 0.016 or 0.032 seconds or any other fast interval of time. For 50 Hz systems the interval will be 0.02 seconds. The controller is executed in any form of digital device such as a computer, relay, or PLC.

The PID controllers have identical structure and are computed in one routine. The PID terms are different for each PID loop. There are 12 parameters in the controller. An estimate for the initial values of these parameters can be determined using MATLab functions. A closed loop simulation of the complete control system is programmed in MATLab and an optimization is performed to find the least integral squared error of the difference between the set points and the measured variables. Other performance criteria may be used including "settling time" and "peak overshoot." The MatLab script becomes a tool to "tune" any controller of this structure. The MatLab function "Loop-Tune" could be used to tune these controllers. Additionally, the tuning could be done to match the closed loop response of the slowest DER in the microgrid. If this is done, then all DERs in the microgrid could receive setpoint commands at the same time. It is likely that the controller parameters can be continually tuned each time there is a disturbance in the system. This technology is outlined in the book *System Identification* by Lennart Ljung. This approach can be implemented by randomly injecting step changes to the system inputs and then identifying the open loop dynamic response of the system. This becomes the new model reference in the controller. This method of "pulsing" the system under closed loop control is well-known technology in other fields, but is considered innovative in the electric power industry.

The set points have rate limits. This is to prevent frequency from exceeded a specified limit. For example the angle set point rates of change would be limited to a reasonable valued such as ±0.05 Hz that translates to ±18 degrees per second. These limits are set by the operator to provide control of the speed of response of the controller to external set point changes.

Model Reference

The model used in the controller is described in the following paragraphs.

The basic model for control is written in the form $$\dot{x}=Ax+Bu$$

Where x is the state of the system, A is the state transition matrix, B is the input distribution matrix and u is the input. Both x and u are (2×1) column vectors. Both A and B are (2×2) matrices. In the steady state, $\dot{x}$ is zero, so one can solve for the steady state input output relationship as $$u=-B^{-1}Ax=Kx$$

We will now find the value for K using first principles.

Figure 6:
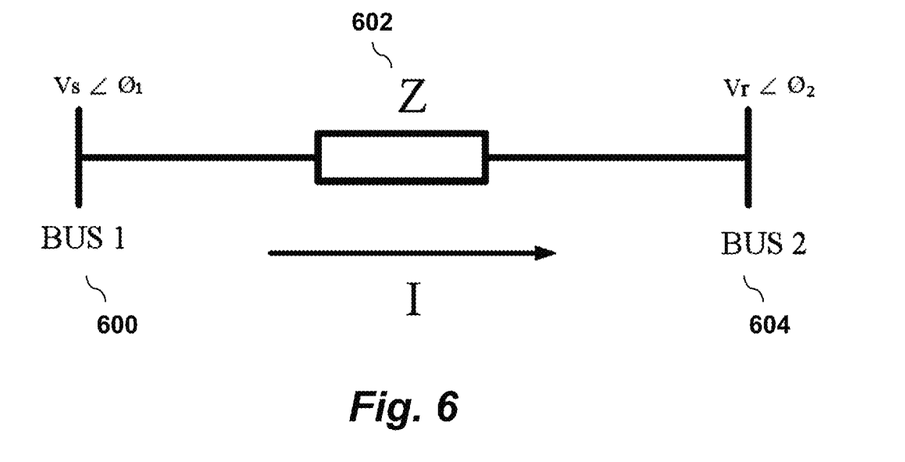
FIG. 6 is a schematic block diagram illustrating a current I and complex impedance Z associated with the control of electric power flows from a DER on Bus 1 to loads on Bus 2, according to an embodiment of the invention.

The basic premise is to control electric power flows from the DER on Bus 1 to loads on Bus 2 according to Ohm's law. This states that the apparent power transfer $\overline{S}$ between two buses is given by the formula $\overline{S}=\overline{E}\overline{I}^*$ (* is the symbol for complex conjugate), where $\overline{V}_s=V_se^{-j\varphi_1}$ is the voltage and phase angle at the sending end, $\overline{V}_r=V_re^{-j\varphi_2}$ is the voltage and phase angle at the receiving end, $\overline{Z}$ is the complex impedance of the line, $\overline{Z}=Ze^{-j\theta}$, where $\theta$ is the impedance angle, and $$I=\frac{\overline{V}_s-\overline{V}_r}{\overline{Z}}$$

is the current phasor. This is illustrated in the block diagram of FIG. 6, which schematically represents a current I and complex impedance Z associated with element 602 between BUS 600 and BUS 604.

This equation can be expanded into real and reactive components by substituting Euler's formula into Ohm's law. The results are the standard equations for real and reactive power flow between buses in an AC network.

$$P=\frac{V_rV_s}{Z}\cos(\delta-\theta)+\frac{V_r^2}{Z}\cos(\theta) \qquad (1)$$

$$Q=\frac{V_rV_s}{Z}\sin(\delta-\theta)+\frac{V_r^2}{Z}\sin(\theta) \qquad (2)$$

where P is real power in each phase, Q is reactive power in each phase, $V_r$ is the voltage magnitude at the load, $V_s$ is the voltage magnitude at the generator, Z is magnitude of complex impedance between the load and the generation, $\delta$ is the voltage angle difference between the load and generation, and $\theta$ is the impedance angle.

Note that this formula is in the notation (X, S) where X is the state vector (input to the system) and S is the apparent power vector (output from the system). This is the conventional form of the power flow equations with impedance between the source and the receive buses and is in the non-linear form used to derive the level two controller as shown below. This is the commonly used description of input and output for a system. The inputs are on the right hand side of the equal sign and the outputs are on the left. These variables are also referred to independent and dependent variables.

The apparent power flow is a function of the voltages at the generator and load and the angle difference between load and the generation assuming the impedance is constant. Thus for any change in angle or voltage, both real and reactive power will change or conversely any change in real or reactive power injected causes both angle and voltage to change. This implies a requirement to "decouple" the voltage and angle control. Note that frequency (rate of change of angle) is exactly at the nominal value (60 or 50 Hz) if the angle is constant. Thus the commonly discussed frequency and voltage controls are in fact angle and voltage control since frequency is constant at 60 Hz if the angle is constant.

The controller should include a framework for simultaneous control of apparent power S where S=P+jQ, where the outputs from the controller are the commanded voltage and angle. The controller can also be configured to control the voltage and angle by commanding changes in real and reactive power. This allows one to configure a hierarchical controller for micro-grids. Additional details are contained in U.S. Pat. No. 8,498,752.

Method of Inverting the Models

One method implementing a decoupled controller is to take the total derivatives of the Ohm's law equations (1) and (2).

Re-writing (1) and (2) as non-linear functions, $$P = f(V_r, \delta) \tag{3}$$

$$Q = f(V_r, \delta) \tag{4}$$

The total derivatives may be written as $$\Delta P = \frac{\partial f}{\partial V_r} \Delta V_r + \frac{\partial f}{\partial \delta} \Delta \delta \tag{5}$$

$$\Delta Q = \frac{\partial g}{\partial V_r} \Delta V_r + \frac{\partial g}{\partial \delta} \Delta \delta \tag{6}$$

These two equations can be written in matrix vector form as:

$$u = Kx \tag{7}$$

Where u is a vector of apparent power represented as S in the above descriptions, x is a vector of the state variable that is represented by X above, and K is a 2×2 square matrix. Lower case x and u are the normal notation used in control theory publications; hence the reason for the notation in the above equations.

$$u = \begin{bmatrix} \Delta P \\ \Delta Q \end{bmatrix} \tag{8}$$

$$x = \begin{bmatrix} \Delta V_r \\ \Delta \delta \end{bmatrix} \tag{9}$$

$$K = \begin{bmatrix} \frac{\partial f}{\partial V_r} & \frac{\partial f}{\partial \delta} \\ \frac{\partial g}{\partial V_r} & \frac{\partial g}{\partial \delta} \end{bmatrix} \tag{10}$$

$$a = \frac{\partial f}{\partial V_r} = \frac{V_s}{Z}\cos(\delta - \theta) - \frac{2V_r}{Z}\cos(\theta) \tag{11}$$

$$b = \frac{\partial f}{\partial \delta} = \frac{V_s V_r}{Z}\sin(\delta - \theta) \tag{12}$$

$$c = \frac{\partial g}{\partial V_r} = -\frac{V_s}{Z}\sin(\delta - \theta) - \frac{2V_r}{Z}\sin(\theta) \tag{13}$$

$$d = \frac{\partial g}{\partial \delta} = -\frac{V_s V_r}{Z}\cos(\delta - \theta) \tag{14}$$

Thus writing the K matrix in terms of (a, b, c, and d)

$$K = \begin{bmatrix} a & b \\ c & d \end{bmatrix} \tag{15}$$

And the inverse of K is given by $$K^{-1} = \begin{bmatrix} d & -b \\ -c & a \end{bmatrix} \frac{1}{(ad - bc)} \tag{16}$$

Thus using the K matrix or its inverse, one can control the pair (P and Q) or (V and δ). A block diagram of a control system based on this approach is shown below.

In summary, the appropriate matrix is used depending on whether controlling (P,Q) or (V,δ). For example, if the control system is used to control (V,δ) (set points are V and δ), then the outputs from the system are (V,δ) and the inputs are (P,Q). Thus the $K^{-1}$ matrix is used.

Figure 7A:
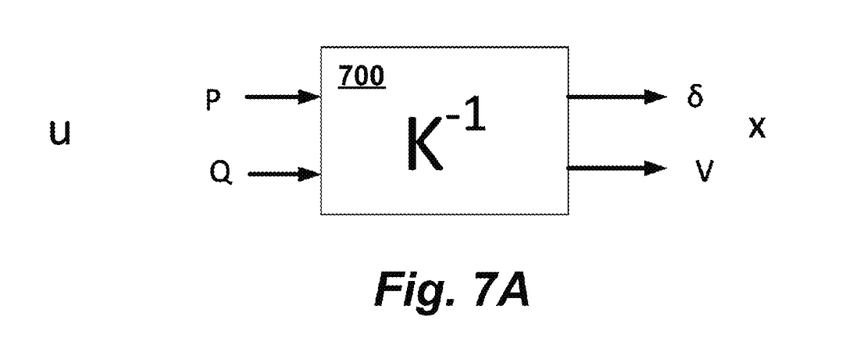
FIG. 7A is a schematic representation of a controller matrix with voltage and angle being controlled (S,X), according to an embodiment of the invention.
Figure 7B:
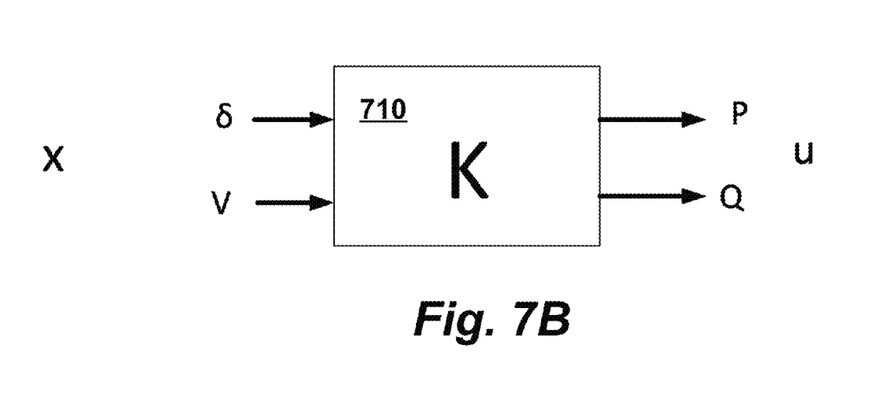
FIG. 7B is a schematic representation of a controller matrix with real and reactive power being controlled (X,S), an inverse controller of that shown in FIG. 7A, according to an embodiment of the invention.

FIG. 7A is a schematic representation of a $K^{-1}$ matrix 700 with voltage and angle being controlled (S,X). FIG. 7B is a schematic representation of a K matrix 710 with real and reactive power being controlled (X,S).

Delay

The delay element is likely to be less than one second in electric power systems. The delays are due to the time delay after the measurement is made in the PMU until the controller computes the next output to the inverter. The control system will work with any delay even one of several minutes provided it is known accurately.

There are likely to be some dynamics in the system. These are characterized by the A matrix. The A matrix can be determined using system identification technology. This is commonly referred to as Realization. Thus if the system has significant dynamics, they are accommodated in the model by adding the identified model to the steady state Ohm's law equations. The model would be the form of the A and B matrices that can be determined by identification.

Load Bus and Disturbances

The loads and disturbances are not measured, but are unknown disturbances to the controller. If they are measured, they can be used as feed forward control elements. A disturbance will cause the system outputs to deviate from their set points resulting in negative feedback to stabilize the system. This feedback control approach is unique in the power industry since most control systems to date use planning forecasts to estimate the loads and the generation. Using this approach, the disturbances are handled by rapid feedback control.

Following is a flow sheet for implementation of the controller according to an embodiment of the invention.

1. Startup

The controller runs as a service. It can run any number of controllers that are configured by means of AF templates (a software object). When the service starts, scan all AF elements associated with the decoupled control template. This could be from one controller to several thousand. The service runs automatically on reboot of the Windows system.

2. Initialization

Initialization is triggered by detecting the "on-control" tag from the template. A change of state from off to on triggers the initialization process. The "on-control" tag is set from a "faceplate". This is the human interface to the micro-grid control system. The operator and turn the controller on or off. The operator can interact with the control system by changing controller parameters, or setpoints or adding a new controller by simply filling in a form containing the measured values and the tuning parameters. For example in the level one controller (S,X), the operator can enter values of P and Q requested from the inverter while in manual mode.

Compute values of the A and K matrices based on parameters in the AF template. Assuming no initial knowledge of the A matrix, it will be the identity matrix. The K matrix includes the constants in equations 11-14. The voltage at the source and receiver are variables and will be read from the AF template. The other variables such as z and $\theta$ can also change in real time thus have to be computed or read from the AF template at least once per second. This is because it is expected that other software applications will be able to compute these parameters in real time and thus the controller adapts to changes in impedance.

Read values of PID coefficients from the AF template. These have to be read periodically since the user can change these at any time. Recommend that these be read from the AF element at least once per second.

Read the constraints on all variables. Each variable and all constants will have an upper and lower bounds. The PID coefficients have to be greater or equal to zero and will have upper bounds.

Read constraints on the rates of change of the set points. This is a limit on the rate of change of moving values of the set points.

Set all values of "e" and its derivatives to zero. Compute the polynomial coefficients needed to estimate the error, error derivative, and second derivative of the error.

Read the status of the "dry-run" switch and set the value of the dry run outputs to zero. Dry running means that the control outputs are written to a PI tag that is not sent to the control device, but are used to test control system to determine its expected performance. The "dry-run" can be used to drive simulators. Recall that the outputs from the controller are incremental values.

Determine if it is midnight, if so, set the bumpless transfer tag true. This will force a bumpless transfer on the first pass through the code.

3. Bumpless Transfer to Automatic Control

On transition from "manual" the target values are set to the current value of the system outputs. This is defined as "bumpless" transfer. There will be a digital tag that defines "bumpless transfer by-pass". This means that a preferred set point can be in memory and the control system will immediately go to a predefined set point value.

The bumpless transfer will also be executed daily at midnight UTC time or whenever there is a global reset of the unwrapped angles. This is the time the angle unwrapping function is reset. It is possible that angle unwrapping reset occurs at more frequent intervals. This controller makes a bumpless transfer each time the angle unwrapping is reset.

4. Execution of Controller

The controller will execute at a high rate, preferably at the same rate as the incoming PMU data. The typical default rate will be at 60 Hz. In cases where the controller runs as level two or level three, a configuration tag defines its rate. It could run as slow as once per five minutes.

The incremental values of the system input changes are computed. It is preferred that the incremental changes be sent to the system and the full value of the system inputs be computed at the input device. In some cases this is not possible, so the controller computes the full value of the system inputs by adding the incremental controller outputs to the current value of the system inputs.

The controller runs until the service is turned off.

The controller can be programmed to run in a stand-alone PLC or in any standard computer. For level one control (Unit), it should be programmed to run as a (S,X) controller. One possible way to program the controller is to develop it entirely in MatLab and then run the MatLab compiler to develop executable code. This code can then be run in a small substation hardened computer like the SEL 3355.

For the second and third level controllers could be programmed in a Microsoft language and run in the PI server hardware box. The preferred language is C# but if programmed in C it can be run in Linux or other operating systems.

Figure 8:
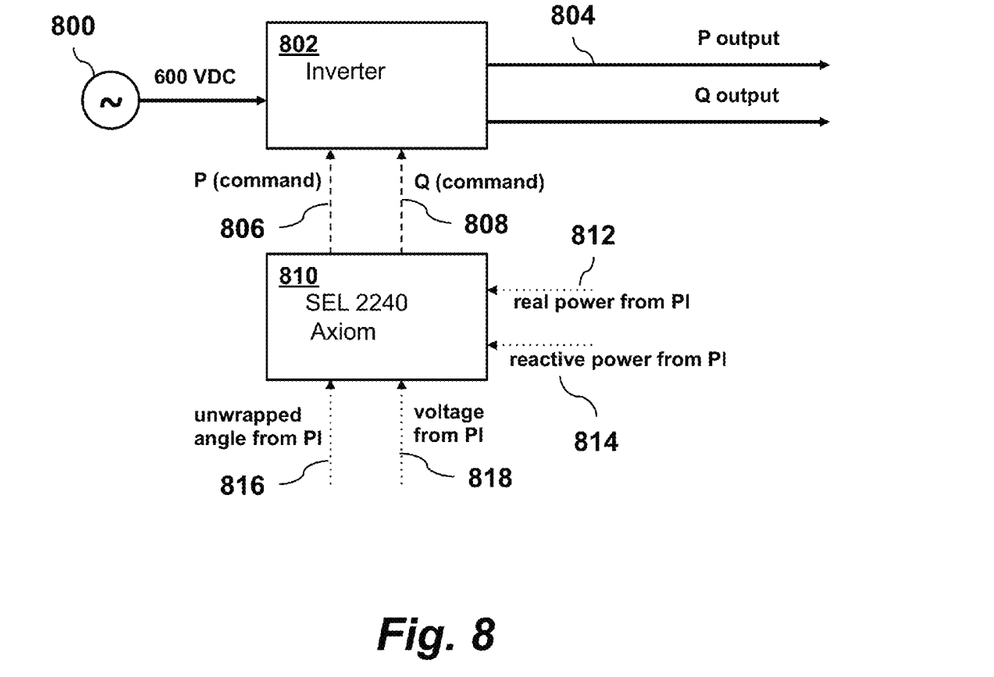
FIG. 8 is a schematic block diagram of an implementation of a level one controller, according to an embodiment of the invention.

Implementation in level one controller is illustrated in FIG. 8. The distributed energy source 800 supplies DC power to the inverter 802 that converts DC power to AC power output as real and reactive power (S). This is the S vector described above. The inverter 802 accepts analog signals (4-20 mA) that represent the requested value of P and Q. These signals are created in a PLC 810 (SEL 2240) using (S,X) form of the decoupled controller. Recall that S is the input to the Unit from the local DER and X is the output of the Unit (X), so this becomes a (S,X) type of controller.

This controller runs at 60 Hz. The controller should be implemented in a PLC type of device. The SEL Axiom is a candidate (SEL 2240). The unwrapped angle 816 and the voltage 818 signals are computed in the PI server and sent to 810 via Modbus over Ethernet protocol. Also signals 812 and 814 are delivered over this protocol to the controller 810. The incremental values of P and Q are computed in the control algorithm and added to the current values 812 and 814 to get the commanded values of P 806 and Q 808. The commands are recomputed at 60 Hz rates. Thus the system can respond very rapidly to changes in local loads or generation.

This Unit controller (S,X) can also be implemented in a standard general purpose computer such as an SEL 3350 provided both the computer and the inverter can communicate over Ethernet. This would be the preferred method of implementing the (S,X) controller at the Unit level since additional computing hardware would not be required.

Uses of the Control Systems.

The two power grid systems $(S_1,X_1)$ and $(S_2,X_2)$ can be synchronized by controlling them both the same X setpoint. This can be done by manually setting them equal, or by forcing the setpoint of one system to follow the other. This is often called setpoint tracking and is balanceless transfer. With setpoint tracking the two systems can automatically separate into islands and reconnect seamlessly. This is one of the desired attributes of microgrids.

Note that if the X values are tracking each other the systems are "virtually" disconnected since there is no power flow between the two systems. This could be called a "virtual breaker" connection between the two grids.

The control system provides substantially better frequency control than conventional droop control systems due primarily to the fast feedback execution of the loop and its decoupling properties.

The control system allows DER systems with different dynamics to be easily integrated into the micro-grid. This is accomplished by setting the tuning parameters of the controller so their closed loop responses are nearly the same. Thus if one of the DERs is a conventional diesel generator with closed loop response of five seconds, then all other inverter based controllers would be tuned to have similar closed loop responses. This will allow supervisory network based calculations of voltages and voltage angles to be sent the Unit controller setpoints for smooth response to the optimal "states" of the power grid. For example, there may be an optimal voltage profile along a feeder circuit inside microgrid. The setpoints for angle and voltage can be sent directly to the Unit controllers and their dynamic response will be identical. Thus all setpoints in the power grid can be changed at the same time.

The control system can be used to add artificial inertial to the system by tuning the parameters of the (S,X) controllers to match the inertia of any rotating machines in the grid. It is also possible make this tuning automatic by identifying the closed loop response of the diesel generator and using that response to tune the inverter based controllers.

The invention claimed is:

1. A micro-grid control system comprising:
   a first 2×2 controller that controls voltage and voltage angle by adjusting real and reactive power using real time feedback;
   a second 2×2 controller that controls real and reactive power by adjusting voltage and voltage angle setpoints using real time feedback;
   a third 2×2 controller that supervises setpoints of the second 2×2 controller;
   wherein the second 2×2 controller is a supervisory controller of the first 2×2 controller;
   wherein the first 2×2 controller and second 2×2 controller together form a hierarchical microgrid control system.

2. The micro-grid control system of claim 1 wherein the voltage and voltage angle are time synchronized with a GPS clock.

3. The micro-grid control system of claim 1 wherein the real and reactive power are time synchronized with a GPS clock.

4. The micro-grid control system of claim 1 wherein the first 2×2 controller is a unit level controller directly manipulating devices that control the supply and/or demand of a power bus.

5. The micro-grid control system of claim 1 wherein the second 2×2 controller controls real and reactive power of the micro-grid to specified setpoints by adjusting angle and voltage setpoints of one or more unit controllers using real time feedback.

* * * * *